No. 609,165. Patented Aug. 16, 1898.
G. PRICE.
JUICE EXTRACTOR.
(Application filed Sept. 13, 1897.)
(No Model.)
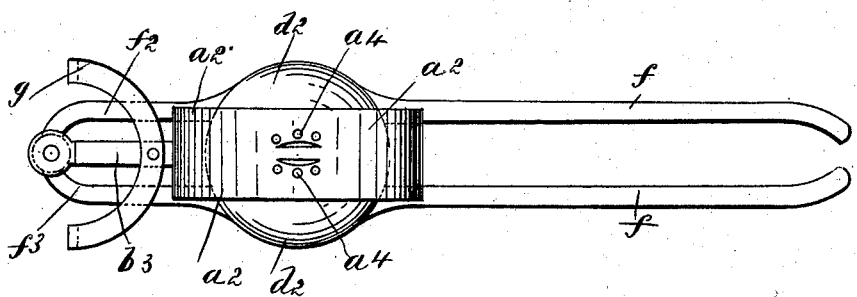
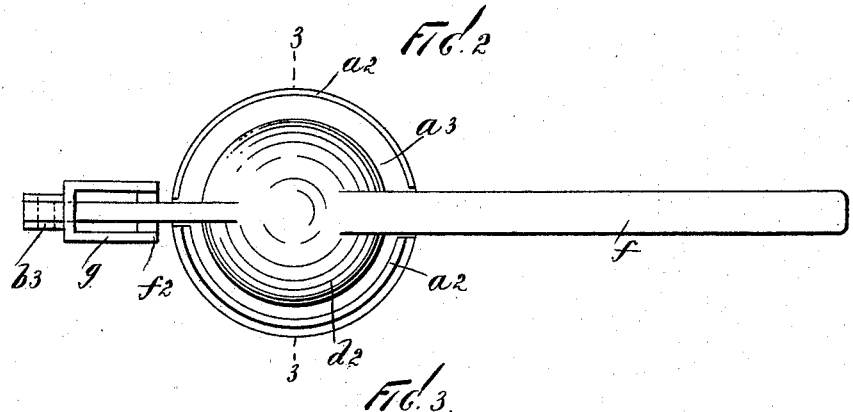
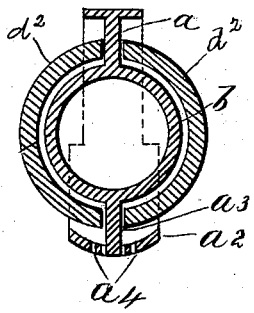
WITNESSES:
John Buckler
C. Gerst
INVENTOR
George Price
BY
Edgar Tate & Co.
ATTORNEYS.
THE NORRIS PETERS CO., PHOTO-LITHO., WASHINGTON, D. C.

UNITED STATES PATENT OFFICE.

GEORGE PRICE, OF TOTTENVILLE, NEW YORK.

JUICE-EXTRACTOR.

SPECIFICATION forming part of Letters Patent No. 609,165, dated August 16, 1898.

Application filed September 13, 1897. Serial No. 651,487. (No model.)

*To all whom it may concern:*

Be it known that I, GEORGE PRICE, a citizen of the United States, residing at Tottenville, in the county of Richmond and State of New York, have invented certain new and useful Improvements in Juice-Extractors, of which the following is a full and complete specification, such as will enable those skilled in the art to which it appertains to make and use the same.

My invention relates to devices for extracting juice from fruits, and has for its object the production of an article of the above-referred-to class which will accomplish the extraction of juice from fruit expeditiously and with a reduction of the amount of labor expended in accomplishing the result.

A further object of the invention is to provide a device of the above-described class that will be simple in construction, efficient in operation, and comparatively inexpensive to manufacture.

The invention consists in the novel features of construction hereinafter set forth and described, and more particularly pointed out in the claims hereto appended.

Referring to the drawings, Figure 1 is a side elevation of my improved device; Fig. 2, a plan view thereof, and Fig. 3 a section on the line 3 3 of Fig. 1.

Like letters refer to like parts throughout the several views.

In the drawings, $a$ denotes a juice-receiver comprising a central sphere $b$, having an outwardly-directed annular flange $a^3$, which at its outer periphery is provided with webs $a^2$, projecting on each side thereof. The webs $a^2$ are preferably extended at one side and provided with openings $a^4$ therein, by means of which the juice may escape after being extracted from the fruit into the vessel designed to receive it.

Adapted to coöperate with the extended sides of the sphere $b$ in extracting juice from fruit are caps $d^2$ $d^2$, which are respectively provided with a handle $f$ and with an extension or projection $f^2$ $f^3$, by means of which they are pivotally united to each other and to the receiver $a$.

To prevent a lateral movement of the caps and their appurtenances, I provide a grooved guide-plate $g$, which is preferably attached to the projection $b^3$, as shown in Fig. 1.

The various parts of my device are preferably made of one piece of casting, except when otherwise specified, and whenever it may be convenient are made hollow to reduce the weight and facilitate the handling of the extractor.

The operation of my improved juice-extractor is as follows: The lemon or the fruit from which the juice is to be extracted is first divided, and then a portion is placed upon each extended portion of the sphere $b$ or within the caps $d^2$ and pressure exerted on the handle $f$, attached to said caps, to compress the fruit between the outer wall of said sphere and the inner portion of the cap, the juice from the fruit being deposited in the receiver and thence passing to any receptacle by means of the openings $a^4$. The said caps, being united by a hinged joint to each other and to a projection attached to or made integral with the annular flange $a^3$ upon the sphere $b$, are capable of moving freely in a vertical direction, while the receiver $a$ and its appurtenances remain perfectly stationary. The guide $g$ will also remain stationary in its relation to the said sphere, thus preventing an excessive lateral movement of the caps and handles thereto.

By the means above described the objects of my invention are fully attained, an inexpensive juice-extractor having been produced which by multiplying the capacity will reduce the labor involved in extracting the juice from the fruit to a minimum. This result is accomplished by a simple construction and arrangement of parts and one which will retain the fruit in its proper position and prevent discomfort occasioned by a disarrangement of parts.

By the hinging of the caps at a point from their operating-surface it will readily be observed that additional power is obtained with the same amount of exertion.

It is to be observed that it is not my intention to limit the invention to the precise construction shown and described, as it is obvious that there may be many variations in minor details of construction without departing from the spirit of my invention.

What I claim, and desire to have protected by Letters Patent, is—

1. In a juice-extractor, a sphere, an outwardly-directed flange thereon, webs projecting from said flanges on each side thereof, caps adapted in conjunction with the exposed surface of said sphere to extract juice from fruit and means for operating said caps, said webs being provided with means to facilitate the escape of the juice, substantially as described.

2. In a juice-extractor, a sphere, an outwardly-directed flange thereon, webs projecting from said flange on each side thereof, a projection attached to said sphere, caps pivotally connected with said projection and means whereby said caps may be brought into coöperation with the exposed surface of said sphere to extract juice from fruit, said webs being provided with means to facilitate the escape of the juice, substantially as described.

3. In a juice-extractor, a sphere, an outwardly-directed flange thereon, webs projecting from said flange on each side thereof, said webs being extended at one side and provided with openings to facilitate the escape of the extracted juice, a projection attached to said sphere, caps pivotally connected to said projection and means whereby said caps may be brought into coöperation with the exposed surfaces of said sphere to extract juice from fruit, substantially as described.

4. In a juice-extractor, a sphere, an outwardly-directed flange thereon, webs projecting from said flange on each side thereof, a projection attached to said sphere, caps provided respectively with an extension pivotally connected with said projection and a handle, and a guide-plate secured to said projection whereby excessive lateral oscillation of the compressors is prevented, substantially as described.

In testimony that I claim the foregoing as my invention I have signed my name, in presence of the subscribing witnesses, this 11th day of September, 1897.

GEORGE PRICE.

Witnesses:
C. GERST,
A. C. VAN BLARCOM.